United States Patent
Shimizu et al.

(10) Patent No.: US 11,188,583 B2
(45) Date of Patent: Nov. 30, 2021

(54) FACILITATING EFFICIENCY IN QUERY RESPONSE

(71) Applicant: International Business Machines Corporation, Armonk, NY (US)

(72) Inventors: Shuichi Shimizu, Koto-ku (JP); Seokwon Hur, Edogawaku (JP)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 16/241,402

(22) Filed: Jan. 7, 2019

(65) Prior Publication Data
US 2020/0218749 A1 Jul. 9, 2020

(51) Int. Cl.
*G06F 16/00* (2019.01)
*G06F 16/33* (2019.01)
*G06F 17/10* (2006.01)
*G06F 16/332* (2019.01)

(52) U.S. Cl.
CPC ...... *G06F 16/3341* (2019.01); *G06F 16/3329* (2019.01); *G06F 17/10* (2013.01)

(58) Field of Classification Search
CPC ... G06F 16/3329; G06F 16/3341; G06F 17/10
See application file for complete search history.

(56) References Cited

U.S. PATENT DOCUMENTS

| | | | |
|---|---|---|---|
| 6,604,090 B1 * | 8/2003 | Tackett | G06N 20/00 706/11 |
| 8,924,223 B2 | 12/2014 | Stillman | |
| 9,558,448 B2 | 1/2017 | Allen et al. | |
| 10,445,668 B2 * | 10/2019 | Oehrle | G06Q 10/063 |
| 2007/0130112 A1 * | 6/2007 | Lin | G06F 16/41 |
| 2010/0332250 A1 | 12/2010 | Simpson et al. | |

(Continued)

FOREIGN PATENT DOCUMENTS

WO   WO 2011/140404   11/2011

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Shew Fen Lin
(74) *Attorney, Agent, or Firm* — Heslin Rothenberg Farley & Mesiti P.C.; Scott Dobson, Esq.

(57) ABSTRACT

A method, computer program product, and system for enhancing dynamically enhancing query results. A processor(s) obtains an inquiry from a user and determines response types and condition elements, to use to determine the unique response type of the inquiry. The processor(s) generates, per type, a response form of slot(s) for condition elements. The processor(s) utilizes the response forms to generate a sum of products expression which it transforms into a product of sums expression. The processor(s) utilizes a first sum term to generate a prompt for a further question to the user. The processor(s) obtains data responsive to the question and interprets the data into condition primitive(s). The processor(s) identifies sum terms comprising the interpreted condition primitive(s), based on comparing the interpreted condition primitive(s) to the condition elements of each sum term. If deleting the sum terms renders the expression empty, the processor(s) identifies the unique response type.

20 Claims, 10 Drawing Sheets

(56) References Cited

U.S. PATENT DOCUMENTS

2012/0220276 A1* 8/2012 Kobylarz ............... H04W 4/00
                                                            455/414.1
2017/0140755 A1* 5/2017 Andreas ............... G10L 15/063
2017/0177715 A1* 6/2017 Chang ................... G06F 40/186

* cited by examiner $$\underbrace{\overline{\overline{abc + ae}}}_{410} = \overline{\overline{abc} \cdot \overline{ae}}$$

$$= \overline{\overline{(\bar{a} + \bar{b} + \bar{c})(\bar{a} + \bar{e})}} \;\text{---}\; 420$$

$$= \overline{(\bar{a}\bar{a} + \bar{a}\bar{e} + \bar{b}\bar{a} + \bar{b}\bar{e} + \bar{c}\bar{a} + \bar{c}\bar{e})}$$

$$430 \;\text{---}\; = \overline{(\bar{a} + \bar{b}\bar{e} + \bar{c}\bar{e})}$$

Reference: Examples of Q&A form

• Payment interpretation for fire insurance

| # | [Purpose] | [Coverage] | [Cause] |
|---|---|---|---|
| {'fire insurance', | 'payment interpretation', | 'building', | 'fire, damage, buried, destroyed by flood'}, |
| {'fire insurance', | 'payment interpretation', | 'building', | 'uninhabitable'}, |
| {'fire insurance', | 'payment interpretation', | 'building', | 'liquefaction phenomenon'}, |
| {'fire insurance', | 'payment interpretation', | 'household good', | 'fire, damage, buried, destroyed by flood'}, |
| {'fire insurance', | 'payment interpretation', | 'work of art', | 'fire, damage, buried, destroyed by flood'}, |
| {'fire insurance', | 'payment interpretation', | 'gates, walls, fences', | 'fire, damage, buried, destroyed by flood'}, |
| {'fire insurance', | 'payment interpretation', | 'money/good', | 'theft'}, |

• Evidence of automobile insurance

| # | [Purpose] | [Content] |
|---|---|---|
| {'automobile insurance', | 'difficult to mount', | 'submit vehicle inspection certificate'}, |
| {'automobile insurance', | 'difficult to mount', | 'name remaining'}, |
| {'automobile insurance', | 'difficult to mount', | 'forms of identification'}, |

• Automobile liability insurance

| # | [Purpose] | [Content] |
|---|---|---|
| {'automobile liability, insurance', | 'payment interpretation', | 'carelessness'}, |
| {'automobile liability, insurance', | 'payment interpretation', | 'caused by earthquake'}, |
| {'automobile liability, insurance', | 'difficult to mount', | 'application form for special measure'}, |

FIG. 6

FACILITATING EFFICIENCY IN QUERY RESPONSE

BACKGROUND

Question and answer software, referred to as Q&A software, enables users to access data without temporal and spatial constraints. The mechanism utilized in Q&A software (sometimes provided as a service) is that a user enters a question and an answer to the question is provided by another entity (user, expert, program, etc.), based on the knowledge of the entity. Existing Q&A software or services include: digital reference or virtual services, expert services, and social Q&A services. Digital reference or virtual services are online references that provide a user with an ability to look up answers to questions without the time and location constraints of physical libraries. Expert services offer answers in specific areas, generally, at a price. Social Q&A services enable users within a community to pose questions, which can be answered by additional users, within the community. Because of the community aspect of this software, Q&A software is frequently integrated by large and specialist corporations to allow their users, who work in similar fields, to discuss questions and provide answers to common and specialized questions. Some software development teams utilize Q&A software to coordinate development and support activities around a given project.

An advantage of utilizing a Q&A system to provide an answer, rather than soliciting answers from one or more individuals, even via a mailing list, is that Q&A software enables the users to receive answers to questions faster. Additionally, because Q&A software stores data received as both questions and answers, the Q&A software is effectively a search database that can provide and rank search results. Thus, user productivity can be improved through the utilization of a Q&A system.

SUMMARY

Shortcomings of the prior art are overcome and additional advantages are provided through the provision of a method for optimizing communications in a Q&A system. The method includes, for instance: obtaining, by one or more processors, via a client computing device, an inquiry from a user; determining, by the one or more processors, based on the inquiry, response types potentially relevant to the inquiry, and condition elements for utilization, by the one or more processors, in determining a unique response of the inquiry; generating, by the one or more processors, for each response type, a response form, wherein each response form comprises one or more slots comprising the condition elements; utilizing, by the one or more processors, the response forms to generate an expression comprising a sum of products, wherein each sum term comprising the sum of products represents a response type of the response types; transforming, by the one or more processors, the sum of products into a product of sums expression comprising the sum terms, wherein the sum terms of the product of sums expression comprise a whole product of the product of sums expression; utilizing, by the one or more processors, a first sum term from the sum terms to generate a prompt for a further question to the user, via the client computing device; obtaining, by the one or more processors, via the client computing device, data responsive to the further question; interpreting, by the one or more processors, the data into one or more condition primitives; identifying, by the one or more processors, one or more sum terms comprising the one or more interpreted condition primitives, based on comparing the one or more interpreted condition primitives to the condition elements of each sum term; deleting, by the one or more processors, the identified sum terms from the whole product of the product of sums expression; determining, by the one or more processors, if deleting the identified sum terms rendered the product of sums expression empty; and based on determining, by the one or more processors, that the product of sums expression empty, identifying, by the one or more processors, the unique response type of the response types.

Shortcomings of the prior art are overcome and additional advantages are provided through the provision of a computer program product for optimizing communications in a Q&A System. The computer program product comprises a storage medium readable by a processing circuit and storing instructions for execution by the processing circuit for performing a method. The method includes, for instance: obtaining, by the one or more processors, via a client computing device, an inquiry from a user; determining, by the one or more processors, based on the inquiry, response types potentially relevant to the inquiry, and condition elements for utilization, by the one or more processors, in determining a unique response of the inquiry; generating, by the one or more processors, for each response type, a response form, wherein each response form comprises one or more slots comprising the condition elements; utilizing, by the one or more processors, the response forms to generate an expression comprising a sum of products, wherein each sum term comprising the sum of products represents a response type of the response types; transforming, by the one or more processors, the sum of products into a product of sums expression comprising the sum terms, wherein the sum terms of the product of sums expression comprise a whole product of the product of sums expression; utilizing, by the one or more processors, a first sum term from the sum terms to generate a prompt for a further question to the user, via the client computing device; obtaining, by the one or more processors, via the client computing device, data responsive to the further question; interpreting, by the one or more processors, the data into one or more condition primitives; identifying, by the one or more processors, one or more sum terms comprising the one or more interpreted condition primitives, based on comparing the one or more interpreted condition primitives to the condition elements of each sum term; deleting, by the one or more processors, the identified sum terms from the whole product of the product of sums expression; determining, by the one or more processors, if deleting the identified sum terms rendered the product of sums expression empty; and based on determining, by the one or more processors, that the product of sums expression empty, identifying, by the one or more processors, the unique response type of the response types.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 is an illustration of various aspects of an embodiment of the present invention;

FIG. 6 depicts one embodiment of a computing node that can be utilized in a cloud computing environment;

DETAILED DESCRIPTION

Figure 1:
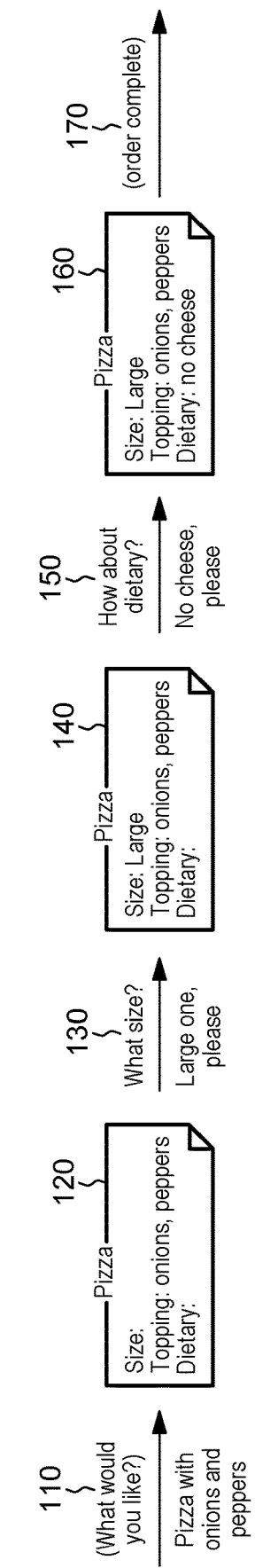
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
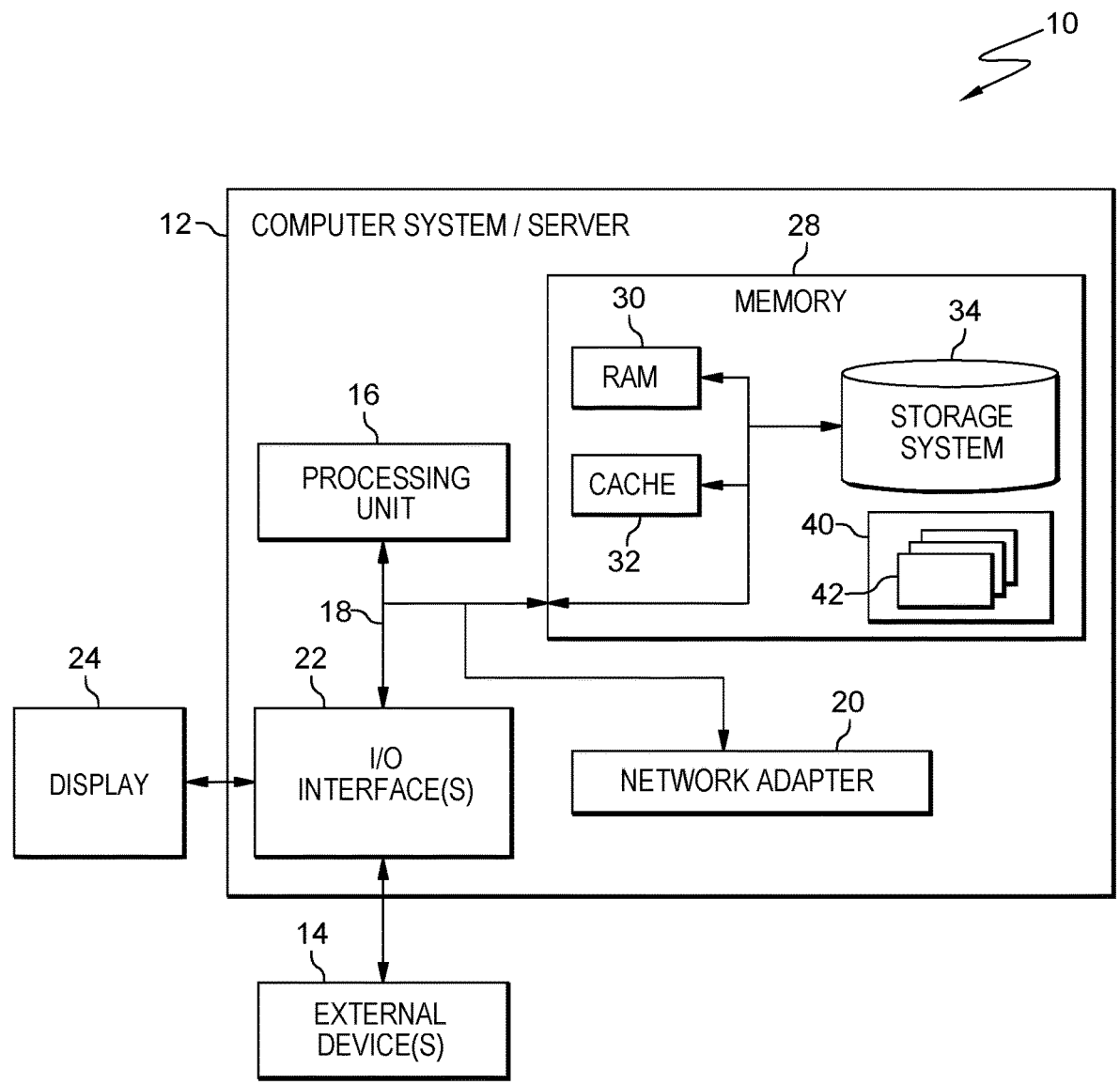
FIG. 8 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

One embodiment of a Q&A system is often referred to as a "chat-bot." It is via this chat-bot that user interface with the Q&A system. Broadly, a chat-bot is a computer program or an artificial intelligence which conducts a conversation via auditory or textual methods and is designed to simulate how a human would behave as a conversational partner. Chat-bots are typically used in dialog systems for various practical purposes including customer service or information acquisition. In certain situations, a chat-bot may be unable to identify a correct response to a user query because the information provided in the query is insufficient to enable to chat-bot to fulfill the request. In these cases, a chat-bot can be configured to ask follow up questions of the user in order to prompt the user to provide sufficient information to respond to the initial query. However, in order to generate and provide effective follow up questions, the chat-bot utilizes data indicating the category or type of responses (collectively "response types"). Unfortunately, this information may not be knowable to the chat-bot until later in the conversation, after many back-and-forth exchanges have taken place. This is inefficient, as is generating, in advance, by the chat-bot, dialog structures to cover all possibilities of response types and (insufficient) condition primitives, beforehand, as system rules. In fact, generating these conditions in advance is likely impossible given that when the total number of primitive conditions is "m", the potential number of conditional rule nodes becomes $2^m$ (i.e., more than one million nodes when m=20 for condition primitives). Thus, a need exists for a computer-implemented method, computer program product, and/or computer system that streamlines query processes in a Q&A system when insufficient information is provided at the onset for immediate processing to provide responsive results.

Embodiments of the present invention include a computer-implemented method, a computer program product, and a computing system, where program code executing on one or more processors automatically determines one or more optimal (or quasi-optimal) further questions to narrow response candidates that comprise further questions aimed to narrow the initial request, where the initial request was missing contextual information sufficient to provide a substantive response. In embodiments of the present invention, program code executing on one or more processors, obtains an inquiry from a user, via entry in a client computing device. Responsive to the entry, the program code defines types of responses to the inquiry and defines condition elements (e.g., intent, entity, etc.) that can be utilized to determine one or more types of response of responses to the inquiry. The program code represents each type of the one or more types of responses in a sum of products form, such that each type is represented by a term of a product. If all the elements in the term of one product are given (when the condition element is given), the program code can determine the (unique) response type. In some embodiments of the present invention, the program code transforms the sum of products in a product of sums form. The program code obtains input text, via the client, to sort the product of sums form as a condition element, generating sorted input text responsive to the data. The program code applies the sorted input text to the product of sums form and if the condition element is included in each term of sum in the product of sums, the program code deletes that term of sum. The program code applies the sorted input text to the sum of products form to determine whether or not each term of the product of sum of products has been given. The program code terminates the application of the sorted input text when the terms of the product of sums become empty and/or if all the terms of product of the sum of products have been given (i.e., all responses having as the condition the subset of the condition elements have been obtained are output). If the terms are not emptied, the program code selects a given term of sum from the remaining terms of sum, in the product of sums, to present to the user as the condition element, by including this given term as a hint (e.g., further question). The program code obtains the user response to the hint via the client and re-generates the sorted input text, in order to attain an empty product sum.

Aspects of various embodiments of the present invention are inextricably tied to computing and provide significant advantages over existing Q&A systems. First, aspects of various embodiments of the present invention are inextricably tied to computing at least because these aspects can be implemented as enhancements to a Q&A system, and can provide enhanced search results to queries. The program code provides these enhanced search results, in part, by generating and maintaining data structures that include knowledge bases for various users, as well as relationships between known entities in the knowledge bases. The program code obtains data for the data structures (and generates the data structures) based on taking advantage of the interconnectivity of various computing systems, including Internet of Things (IoT) devices and personalized computing devices. Thus, aspects of embodiments of the invention are inextricably tied to computing at least because they represent enhancements to a system that is native to computing and exploit a computing infrastructure to provide this enhancement. Embodiments of the present invention are also inextricably tied to computing because certain aspects are directed to enhancing a user interface to a computing device.

Second, aspects of various embodiments of the present invention present advantages over existing Q&A systems and systems that provide search results responsive to user queries, including chat-bots (and interact with users to reach the eventual results). In embodiments of the present invention, program code executing on one or more processors defines types of responses to an inquiry from a user and condition elements by uniquely determining the types of the respective responses and expressing the responses in sum of products form. The program code transforms the sum of products form of the response into a product of sums form and the program code obtains input text from a user, via a client communicatively coupled to the one or more processors, to sort a condition element. The program code deletes an entire term of sum by applying the sorted input text to the product of sums form and determines the terms of the product of sum of products that have been given by applying, by the program code, the sorted input text to sum of products form. The program code selects a given term of sum among the remaining terms of sum in the product of sums to present to the user, including the condition element, as a hint (e.g., further question). Although existing enhancements to Q&A systems that arguably disclose a method of dynamically reducing a number of follow-up questions presented to a user, by modifying subsequent communications (content of questions) in a deep Q&A system, based on analyzing the user's responses to previous questions, according to the user's level of sophistication, these existing approaches do not contemplate defining types of responses to an initial input and utilizing this data to ultimately craft a follow up question and/or provide an answer to the initial query.

In general, embodiments of the present invention address a shortcoming in existing a slot-filling schemes in Q&A Systems, such as chat bots. Although certain existing approaches can supplement inputs when user input is lacking, when the user's initial entry does not provide the program code with sufficient information to infer or extrapolate a purpose of the inquiry (i.e., response type sought), existing slot-filling schemes alone cannot streamline the process and additional back-and-forth between the user and the program code is required to tune the question. FIG. 1 is an example of a workflow 100 in an existing slot-filling approach utilized in some existing systems. Examples of two slot-filling approaches that can be utilized in conjunction with embodiments of the present invention are the IBM Watson® Conversation Service (WCS) and Amazon Lex. IBM Watson® is a product of International Business Machines Corporation. IBM Watson® is a registered trademark of International Business Machines Corporation, Armonk, N.Y., US. Both IBM Watson® Conversation Service (WCS) and Amazon Lex are existing slot-filling technologies that can be integrated into embodiments of the present invention. These two technologies are merely offered for illustrative purposes, as embodiments of the present invention can utilize a variety of slot-filling technologies, which, as explained herein, aspects of the present invention will enhance in order to optimize and streamline user interactions with Q&A Systems.

Referring to FIG. 1, the workflow 100 illustrates how slot-filling operates to provide a complete input to a Q&A System such that an action can be taken by the program code. However, in this example, the user has entered sufficient information such that the slot-filling software can determine the purpose of the inquiry from the initial input. As will be discussed here, aspects of various embodiments of the present invention address scenarios where this purpose is not apparent at this initial state. In the slot-filling workflow, a user provides input responsive to a request for an order, "What would you like?" through an interface, including but not limited to an auditory interface and/or a graphical user interface (GIU). The user inputs, in this example through an auditory input and/or through text, through a computing device, a request for "Pizza with onions and pepper," (110). A slot-filling program determines that the size and any special dietary requests were absent from the input (120). The slot-filling program prompts the user to provide the missing information (i.e., to fill the slots of size and dietary restrictions). In this example, the slot-filling program prompts the user as to "What size?" pizza the user would like to order and receives the response of a "Large one, please." (130). The workflow 100 illustrates how the slot-filling has obtained the input (130) and utilized it to fill a slot, size as large (140). To continue filling the slots, the slot-filling program code, through an interface, solicits dietary restrictions (i.e., "How about dietary restrictions?") and obtains, through an interface, a response (i.e., "No cheese, please,") (150). Having filling all the slots, (160), the program code can place the order (170).

Figure 2:
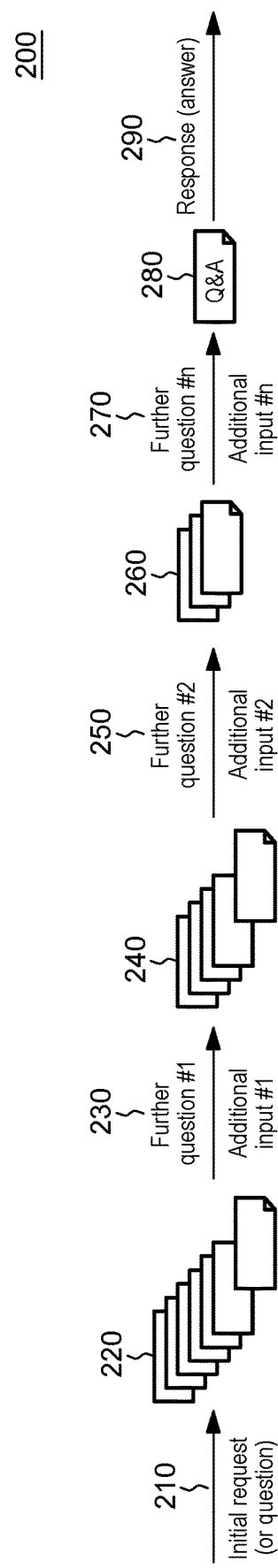
FIG. 2 is a workflow illustrating certain aspects of an embodiment of the present invention.

FIG. 2 provides a less specific example of a slot-filling workflow 200. This workflow 200 illustrates how a chat bot focusses an initial inquiry (210) through a back-and-forth with a user, such that the initial inquiry includes sufficient data to enable the Q&A Systems to provide an answer. The user provides an initial inquiry (a request or a question) through an interface (210). The program code determines that based on unfilled slots, many different possibilities exist regarding what could be a complete inquiry (220). The number of possibilities for a response can be understood as "response" cards or forms, which the program code can reduce in number as the specificity of the inquiry increases. For example, in the case of the pizza in FIG. 1, a complete order could comprise one of many different sizes and one or many different dietary restrictions. Thus, to fill the slots, the slot-filling program code solicits further questions from the user, through an interface and obtains responses (230), (250), (270), and the slot-filling program code utilizes the responses to reduce the possibilities (220), (240), (260), and eventually, when slots of sufficiently filled (280) to respond to the initial inquiry (290).

FIGS. 1-2 demonstrate how existing slot-filling systems can be utilized to enhance inputs in Q&A Systems. However, in both examples, the purpose of the initial input by the user was determined by the program code from the onset and all that was needed was to narrow the inquiry by adding additional details. However, an initial inquiry can lack this type of information from the onset, which proves a challenge to existing slot-filling techniques. When no purpose is apparent, the slot-filling programs are unable to efficiently enumerate the cases of further questioning in advance and create a rule (program) considering the combinational aspects. Aspects of embodiments of the present invention fill this gap by gathering possible candidate information in advance of determining the type of the response and concurrently narrowing down the types of responses, to uniquely determine a corresponding type of response to an initial inquiry. Thus, in embodiments of the present invention, the program code determines a category or type of response (collectively "response types") to an input, when this information cannot be determined automatically by existing slot-filling systems, upon obtaining the initial input.

Figure 3:
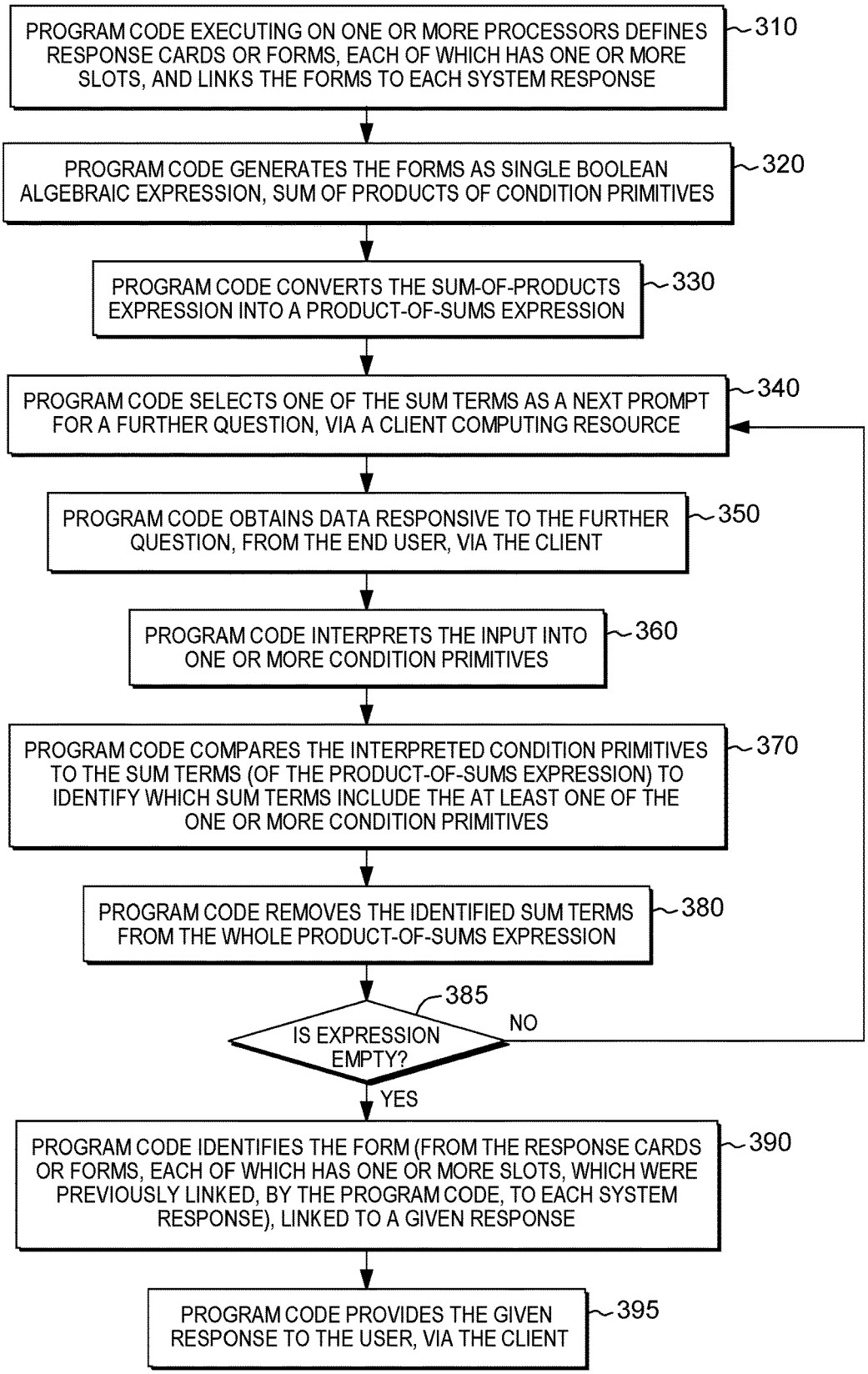
FIG. 3 is a workflow illustrating certain aspects of an embodiment of the present invention.

FIG. 3 provides a workflow 300 that illustrates some aspects of some embodiments of the present invention. In an embodiment of the present invention, program code executing on one or more processors defines response cards or forms, each of which has one or more slots, and links the forms to each system response (310). When all of the slots (i.e., condition primitives) are fulfilled and satisfied for a certain form, the program code can determine the corresponding system response to an input. Thus, each system response is associated with any one of multiple "form" formats and the program code selects a system response, uniquely, if conditions stated in the form are met. Equation 1 represents the "form" format and the conditions associated with the form.

$$F = \sum_{k=1}^{n} \prod_{l=1}^{n_k} p_l^k \qquad \text{(Equation 1)}$$

In Equation 1, "n" is the total number of the forms, and the "condition unit" necessary for k-th form is represented by Variable 1 below.

$$\{p_l^k | 1 \leq l \leq n_k\} \qquad \text{(Variable 1)}$$

The total number number of the condition units, which are Boolean variables, is "m", then Condition 1 below is satisfied.

$$p_l^k \in \{p_1, p_2, \ldots, p_m\} \qquad \text{(Condition 1)}$$

When at least one element is not obtained, there is insufficient information (unsaturation) in Variable 1. However, if the conditions are met in any one of the forms, a saturation state is entered and "F" in Equation 1 becomes true. In embodiments of the present invention, whether F in Equation 1 is true or false is not affected even when some of the condition units remain undetermined as true or false.

As understood by one of skill in the art, the confirming all of the total number "m" of the condition units through further questions would result in the largest processing. Thus, as illustrated in FIG. 3, the program code enables the Boolean formula to become true by using the stochastically smallest number of further questions to determine the response (type).

Returning to FIG. 3, in some embodiments of the present invention, the program code generates the forms as single Boolean algebraic expression, sum of products of condition primitives (320). Thus, when one of the forms is fulfilled, then the expression shows "true" even if most of the condition primitives remain unknown. The program code converts the sum of products expression into a product of sums expression (e.g., by applying De Morgan's Law, twice) (330). Hence, the response condition expression defined in the form of sum of products is transformed into the form of product of sums, as illustrated below, including in Equation 2.

$$F = \prod_{i=1}^{N} \sum_{j=1}^{N_i} p_j^{[i]} \qquad \text{(Equation 2)}$$

Upon completion of this conversion, when the sum term is true, this renders the whole expression true. Thus, the program code has a response against the set of condition primitives given so far. As noted above, the conversion or transformation (330) can be accomplished by applying De Morgan's Law. The program code can achieve the transformation (330) in two rounds of the application of De Morgan's Law, followed by one round of expansion (transformation) into the product of sums. In some embodiments of the present invention, the program code can guarantee a minimum by using a Quine-McCluskey scheme. After this conversion, if all condition units included in any one of the terms of the sum are false, then the formula F never becomes true. In embodiments of the present invention, if the program code provides a response, at least one portion of Variable 2 is expected to be true.

$$\{p_j^{[i]} | 1 \leq j \leq N_i\} \qquad \text{(Variable 2)}$$

FIG. 4 provides an example of a transformation 400 of a response condition expression defined in the form of sum of products into the form of product of sums, by the program code, in embodiments of the present invention. As further illustrated in FIG. 4, the program code carrying out two rounds of application of De Morgan's Law and one round of expansion (transformation) of the product of sums refers to the expressions that follow:

De Morgan's Law Rule 1: $\overline{A \cdot B} = \overline{A} + \overline{B}$
De Morgan's Law Rule 2: $\overline{A + B} = \overline{A} \cdot \overline{B}$ In FIG. 4, the double bar 410 indicates the double application of De Morgan's Law by the program code. FIG. 4 also illustrates the expansion of product of sums 420 and that a term, $\bar{a}$, which becomes true is excluded 430 by the program code.

Returning to FIG. 3, in some embodiments of the present invention, the program code selects one of the sum terms as a next prompt for a further question, via a client computing resource (340). To narrow the inquiry to determine the response type, the program code utilizes the selected sum term to prompt the end user with hints in order to request that the user provide one or more condition primitives included in the sum term in response to the hints. By selecting one of the sum terms, the program code effectively generates a further question regarding all the conditions included in Variable 3, below.

$$p_j^{[i]} \qquad \text{(Variable 3)}$$

In various embodiments of the present invention, the program code can utilize a variety of approached to select the sum term to utilize to generate the further question. For example, the program code can select a sum term having a smaller number of conditions and/or a sum term having condition types of lower dispersion. No system response exists if there is no corresponding input, thus, the program code will terminate this process with no response found. The program code obtains data responsive to the further question, from the end user, via the client (350). The program code interprets the input into one or more condition primitives (360). The program code compares the interpreted condition primitives to the sum terms (of the product of sums expression) to identify which sum terms include the at least one of the one or more condition primitives (370). The program code removes the identified sum terms from the whole product of sums expression (380). Hence, the program code deletes all the sum terms, including newly obtained condition units, in accordance with an additional input. The program code determines if the removal of the identified sum terms resulted the expression becoming empty of sum terms (385).

Once the expression is emptied of sum terms, by the program code, the program code can identify the response, which it can provide to the user. Based on the removal resulting in the expression becoming empty of sum terms, the program code identifies the form (from the response cards or forms, each of which has one or more slots, which were previously linked, by the program code, to each system response), linked to a given response (390). The program code provides the given response to the user, via the client (395).

If the expression is not empty, the program code requests further user input to determine the response. Thus, based on the removal resulting in the expression not becoming empty of sum terms, the program code selects one of the sum terms (remaining in the product of sums expression after the removal of other terms) as a next prompt for a further question (in this example, an additional further question), via a client computing resource (340). The program code obtains data responsive to the (additional) further question, from the end user, via the client (350). The program code interprets the input into one or more condition primitives (360). The program code compares the interpreted condition primitives to the sum terms (remaining in the product of sums expression after the initial removal) to identify which sum terms include the at least one of the one or more condition primitives (370). The program code removes the identified sum terms from the whole product of sums expression (380). The program code determines if the removal of the identified sum terms resulted the expression becoming empty of sum terms (385). Based on whether or not the expression is empty, the program code will either identify the form linked to a given response (390) and provide the given response to the user, via the client (395), utilize the response to take an action, or select one of the sum terms (remaining in the product of sums expression after the removal of other terms) as a next prompt for a further question (in this example, an additional further question), via a client computing resource (340) and continue this process until the expression is empty and the program code can determine the response (390).

In general, each response cards or forms (e.g., FIG. 3, 310) can be expressed by a combination of Boolean variables: F=abc+ad+ce. Each Boolean variable is a unit of information that can be captured from an input text as an intent or entity. Thus, the form as a whole can be expressed in the form of sum of products as indicated in F=abc+ad+ce. In this example, the number of terms of the products (e.g., abc) corresponds to the number of the forms and any number of terms is possible, rendering this aspect of embodiments of the present invention scalable. For example, substituting real values for the variables, in a non-limiting illustrative example, F=[fire insurance][liquefaction phenomenon][payment interpretation]+[fire insurance][household goods]+[payment interpretation][money and goods].

As illustrated in FIG. 3, by information gathering, if the expression becomes true, the program code has determined the response. The program code generates further questions utilizing the sum terms to determine the response (e.g., FIG. 3, 340). In some embodiments of the present invention, in order to decide on the order of the further questions and the content of the prompt, the program code transforms the sum of products form into the product of sums form: F=(a+c)(a+e)(c+d)(b+d+e). Transforming the example with the real values above, the resulting product of sums is: F =(fire insurance+payment interpretation) (fire insurance+money and goods) (payment interpretation+household goods) (liquefaction phenomenon+household goods+money and goods).

If any one of the terms of sums is not satisfied, then there will be no response. Hence, the program code can generate further questions for response such as "How about a? How about c?" to garner responses to all terms of sums. But, when a further question is made about a Boolean variable that reduces the number of the terms of the product most, the process is most efficient as the correct response can be determined in a shortest amount of time. This minimal follow up is guaranteed by transformation by a Quine-McCluskey scheme. Returning to the example with real values, a first question generated by the program code is: "Is it with regard to 'fire insurance'? Or is it with regard to 'payment interpretation'?" The user (in this example) provides an answer, through an interface, "This is with regard to 'fire insurance.'" The expression, F=(fire insurance+payment interpretation) (fire insurance+money and goods) (payment interpretation+household goods) (liquefaction phenomenon+household goods+money and goods) is affected by this input. As a results of 'fire insurance' having been selected, the term of the sum that became true will not become the prompt candidate for the next round. The program code generates a second question, "Is it with regard to 'payment interpretation'? Or is it with regard to 'household goods'?" The user provides the answer, "This is with regard to 'household goods.'" The expression F=(fire insurance+payment interpretation) (fire insurance+money and goods) (payment interpretation+household goods) (liquefaction phenomenon+household goods+money and goods) is impacted by this input. Based on these answers, 'fire insurance' and 'household goods' were obtained by the program code, the program code ends the prompt and a response to ad [fire insurance][household goods] is presented.

Figure 5:
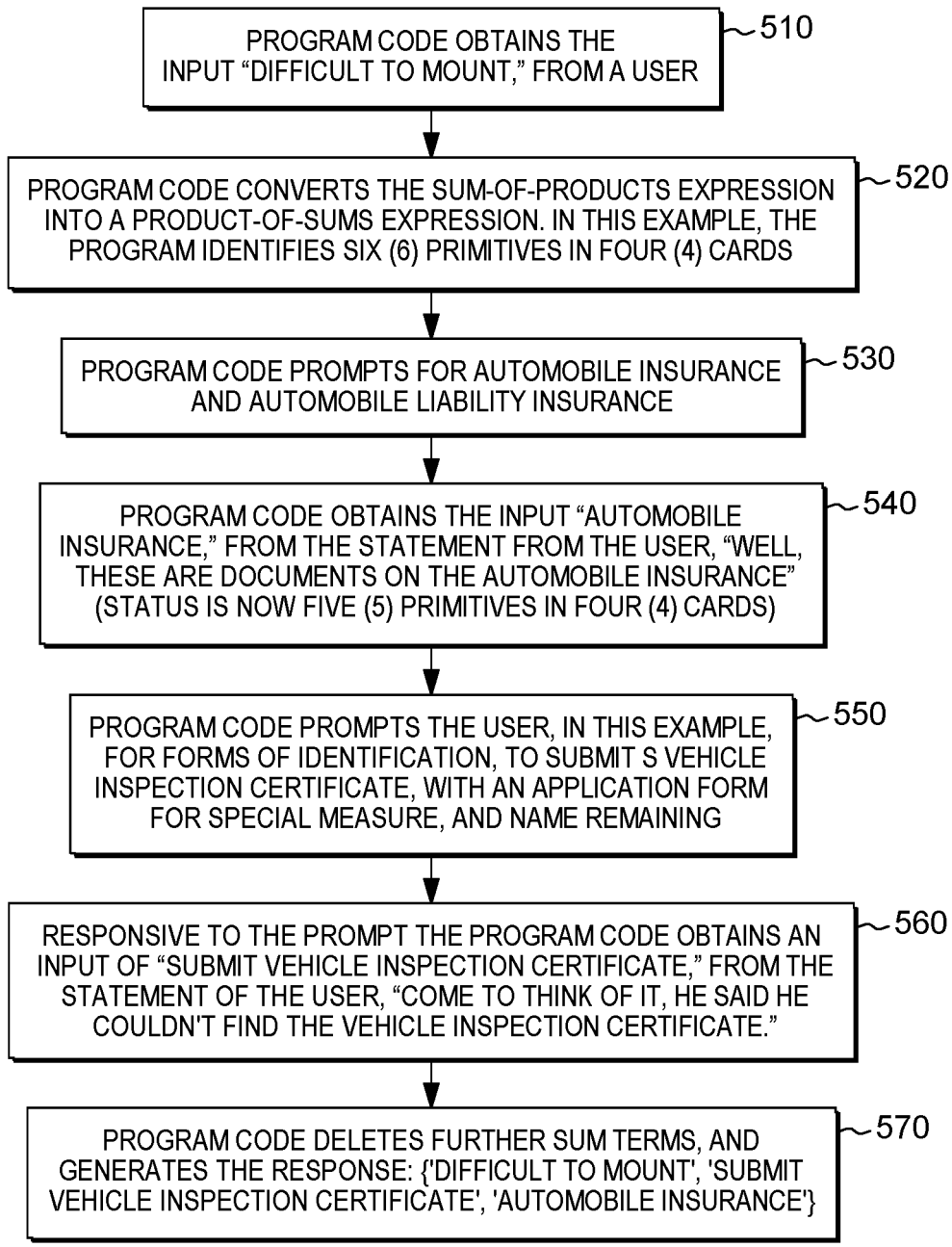
FIG. 5 is a workflow illustrating certain aspects of an embodiment of the present invention.

A workflow 500 of the program code in embodiments of the present invention providing further questions is illustrated in FIG. 5. This example is non-limiting and is provided for illustrative purposes only. This example illustrated in FIG. 5 is a workflow 500 of the program code additionally carrying out two further questions in addition to the first question to determine a response uniquely, based on utilizing aspects of some embodiments of the present invention. The workflow 500 of FIG. 5 assumes use of a Q&A form with constituent elements listed below:

Conditions associated with types of insurance:
fire insurance
automobile insurance
automobile liability insurance
vehicle inspection certificate
Conditions associated with purposes:
payment interpretation
on-the-spot inspection
government surveillance
cancellation of contract
vehicle disposal
special measures
special contract covering damages caused by other vehicles
difficult to mount
extension
Conditions associated with causes:
fire damage
buried
destroyed by flood
uninhabitable
subsidence and dipping
theft
Conditions associated with objects to be covered:
buildings
household goods
works of art
gates, walls, and fences
money and goods
Conditions associated with details:
repair costs
time of clearance
time of inspection
evidence of inspection
relevance of examination results
substitute for examination results
necessity of administrative examination
loss of buildings
loss of household goods
loss of vehicle
replacement of vehicles
death of insured person
the same vehicle as the one that is subject to certificate of suspension
expiration of effective period of certificate of suspension
expiration of period of issuance of certificate of suspension
remedy for failure of renewal
remedy for omission of collection
suspension until new contract
remedy for omission of notification
submission of vehicle inspection certificate
name remaining
forms of identification
long-term use of substitute vehicle
delayed delivery of new vehicle
causes associated with earthquake
carelessness
delayed adjustment
seal not available
application form for special measures
location of principal use
re-extension FIG. 6 is an example of a Q&A form incorporating the constituent elements.

Returning to FIG. 5, at an initial stage, the program code obtains the input "difficult to mount," from a user (510). Specifically, a user provides the input, "I have difficulty in mounting it because I have a lot to do on account of the Earthquake." Responsive to the input, the program code defines response cards or forms, each of which has one or more slots, and links the forms to each system response and the program code generates the forms as single Boolean algebraic expression, sum of products of condition primitives. The program code converts the sum of products expression into a product of sums expression. In this example, the program identifies six (6) primitives in four (4) cards (520). The program code selects one of the sum terms as a next prompt for a further question, via a client computing resource. In this example, the program code prompts for automobile insurance and automobile liability insurance (530). The program code obtains the input "automobile insurance," from the statement from the user, "Well, these are documents on the automobile insurance," (540).

The program code interprets the input into one or more condition primitives and the program code compares the interpreted condition primitives to the sum terms to identify which sum terms include the at least one of the one or more condition primitives. The program code can than remove the identified sum terms from the whole product of sums expression. Based on obtaining the response to the initial prompt the status is now five (5) primitives in four (4) cards. Thus in this example, the program code could not delete all the sum terms, so the expression is not empty, and the program code generates further follow up questions from remaining sum terms. The program code prompts the user, in this example, for forms of identification, to submit s vehicle inspection certificate, with an application form for special measure, and name remaining (550). Responsive to the prompt the program code obtains an input of "submit vehicle inspection certificate," from the statement of the user, "Come to think of it, he said he couldn't find the vehicle inspection certificate," (560). Based on the input, the program code deletes further sum terms, and generates the response: {'difficult to mount', 'submit vehicle inspection certificate', 'automobile insurance'}(570).

Figure 7:
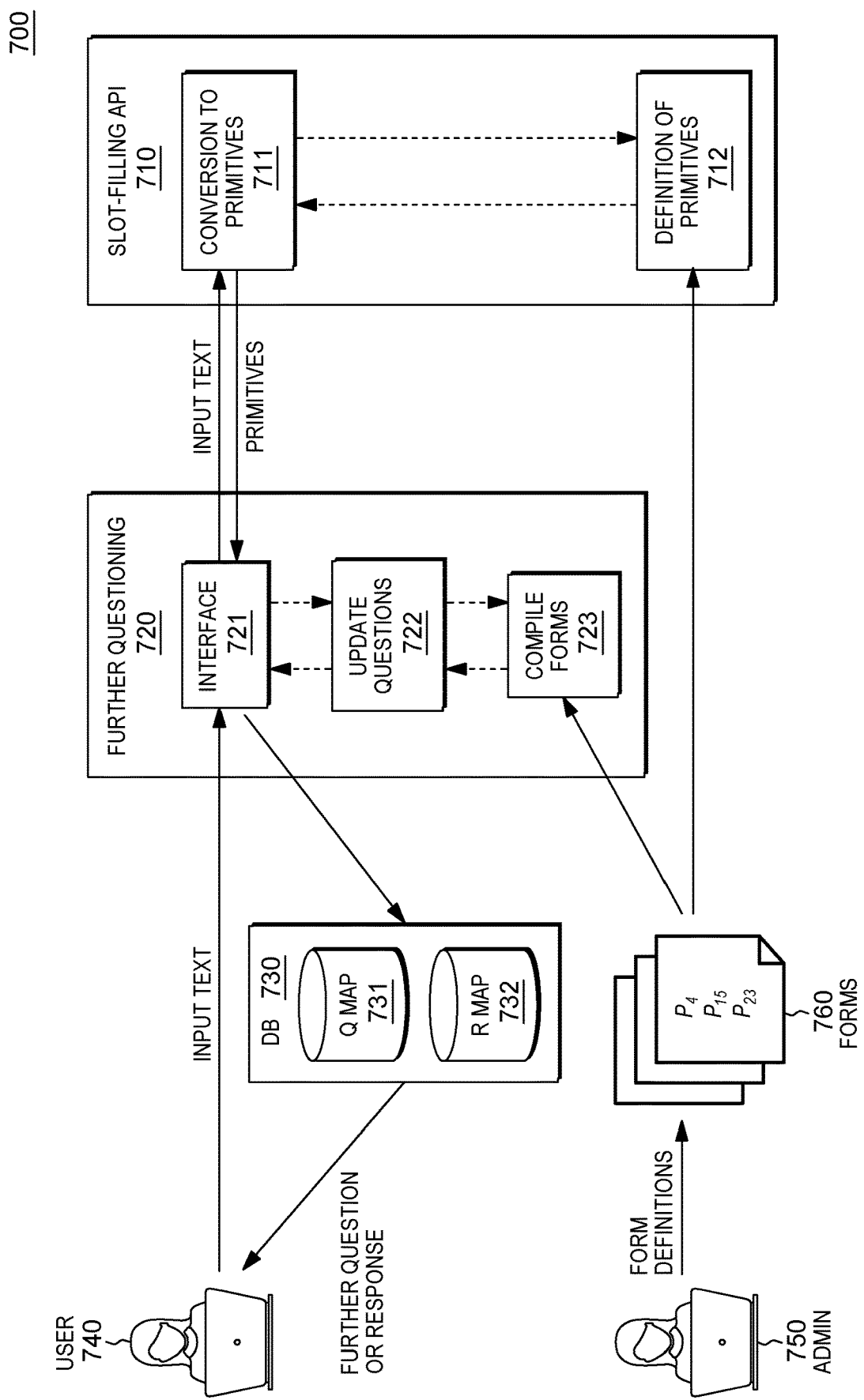
FIG. 7 is a technical environment into which certain aspects of the present invention can be implemented.

FIG. 7 illustrates a technical environment 700 into which aspects of some embodiments of the present invention can be implemented. The embodiments implemented in FIG. 7 utilizes an existing slot-filling API 710, to obtain intents and entities and to convert them to condition units. Program code executing on one or more processing resources is illustrated as a further questioning module 720 (for ease of understanding, only). The program code of the further questioning module 720 repeatedly asks further question (or otherwise solicits other input) from a user 740 until the forms 760 (e.g., response cards) are determined to be true.

In the illustrated embodiment of the present invention, an administrator 750 (entity, process and/or person) creates form definitions, which the program code utilizes to generate forms 760, which are compiled 723 (e.g., prepared) by the program code of the further questioning module 720. The forms are also utilized by the program code of the slot-filling API 710 to define the primitives 712, creating an intent/entity definition. The program code of the further questioning module 710 interfaces 721 with the slot-filling API 710 to obtain primitives defined 712 and converted 711 by the slot-filling API 710. The program code of the further questioning module 720 also communicates with a database 730 that includes both a further question map 731 and a response map 731. The program code of the questioning module 720 provides further questions or responses to a user 740, via the database 730. When a user 740 provides an initial input to the questioning module 720, the further questioning module 720 interfaces with the slot-filling API 710, supplying the input text to obtain primitives.

Embodiments of the present invention include a computer-implemented method, a computer program product, and a computer system, where program code executing on one or more processors obtains, via a client computing device, an inquiry from a user. The program code determines, based on the inquiry, response types potentially relevant to the inquiry, and condition elements for utilization, in determining a unique response of the inquiry. The program code generates, for each response type, a response form, where each response form comprises one or more slots comprising the condition elements. The program code utilizes the response forms to generate an expression comprising a sum of products, where each sum term comprising the sum of products represents a response type of the response types. The program code transforms the sum of products into a product of sums expression comprising the sum terms, where the sum terms of the product of sums expression comprise a whole product of the product of sums expression. The program code utilizes a first sum term from the sum terms to generate a prompt for a further question to the user, via the client computing device. The program code obtains, via the client computing device, data responsive to the further question. The program code interprets the data into one or more condition primitives. The program code identifies one or more sum terms comprising the one or more interpreted condition primitives, based on comparing the one or more interpreted condition primitives to the condition elements of each sum term. The program code deletes the identified sum terms from the whole product of the product of sums expression. The program code determines if deleting the identified sum terms rendered the product of sums expression empty. Based on determining that the product of sums expression empty, the program code identifies the unique response type of the response types.

In some embodiments of the present invention, in order to save computing costs when the computing cost of transforming sum of products to product of sums expression could exponentially increase, the program code determines, based on the inquiry, response types potentially relevant to the inquiry, and condition elements for utilization, in determining a unique response of the inquiry. The program code generates, for each response type, a response form, where each response form comprises one or more slots comprising the condition elements. The program code utilizes the response forms to generate an expression comprising a sum of products, where each sum term comprising the sum of products represents a response type of the response types. The program code selects single terms from each of product terms in the sum of products expression, where the selected terms comprise the minimum or near-minimum number of condition elements. The program code utilizes the minimum or near-minimum number of condition elements to generate a prompt for a further question to the user, via the client computing device. The program code obtains, via the client computing device, data responsive to the further question. The program code interprets the data into one or more condition primitives. The program code identifies one or more sum terms comprising the one or more interpreted condition primitives, based on comparing the one or more interpreted condition primitives to the condition elements of each sum term. The program code deletes the identified sum terms from the whole product of the product of sums expression. The program code determines if deleting the identified sum terms rendered the product of sums expression empty. Based on determining that the product of sums expression empty, the program code identifies the unique response type of the response types.

In some embodiments of the present invention, the program code provides the response type to the user, via the client computing device.

In some embodiments of the present invention, based on determining that the product of sums expression is not empty, the program code utilizes a second sum term from the sum terms remaining after the deleting, to generate a prompt for another further question to the user, via the client computing device, where the sum terms remaining after the deleting comprise remaining terms, where the product of sums expression after the deleting is a modified product of sums expression. The program code obtains, via the client computing device, additional data responsive to the other further question. The program code interprets the additional data into one or more condition primitives. The program code identifies one or more remaining terms comprising the one or more interpreted condition primitives of the additional data, based on comparing the one or more interpreted condition primitives of the additional data to the condition elements of the remaining terms. The program code deletes the identified remaining terms from the whole product of the modified product of sums expression. The program code determines if deleting the identified remaining terms rendered the modified product of sums expression empty. Based on determining that the modified product of sums expression empty, the program code identifies the unique response type of the response types.

In some embodiments of the present invention, determining response types and condition elements comprises utilizing a slot-filling system.

In some embodiments of the present invention, transforming the sum of products comprises applying De Morgan's Law twice to the sum of products.

In some embodiments of the present invention, the further question comprises a condition element.

In some embodiments of the present invention, the first sum term comprises a sum term and of sum terms with a smallest number of relevant condition elements.

In some embodiments of the present invention, the first sum term comprises a sum term and of sum terms with relevant condition elements comprising condition types of a lower dispersion than dispersions of a group of sum terms excluding the first sum term.

In some embodiments of the present invention, the condition elements are selected from the group consisting of: an intent and an entity.

In some embodiments of the present invention, utilizing the response forms to generate an expression comprising a sum of products, comprises generating a Boolean algebraic expression.

In some embodiments of the present invention, each condition element is represented by a condition primitive.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors executing the further questioning module 720 (FIG. 7) and the one or more resources housing the database 740, can each be understood as a cloud computing node 10 (FIG. 8) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
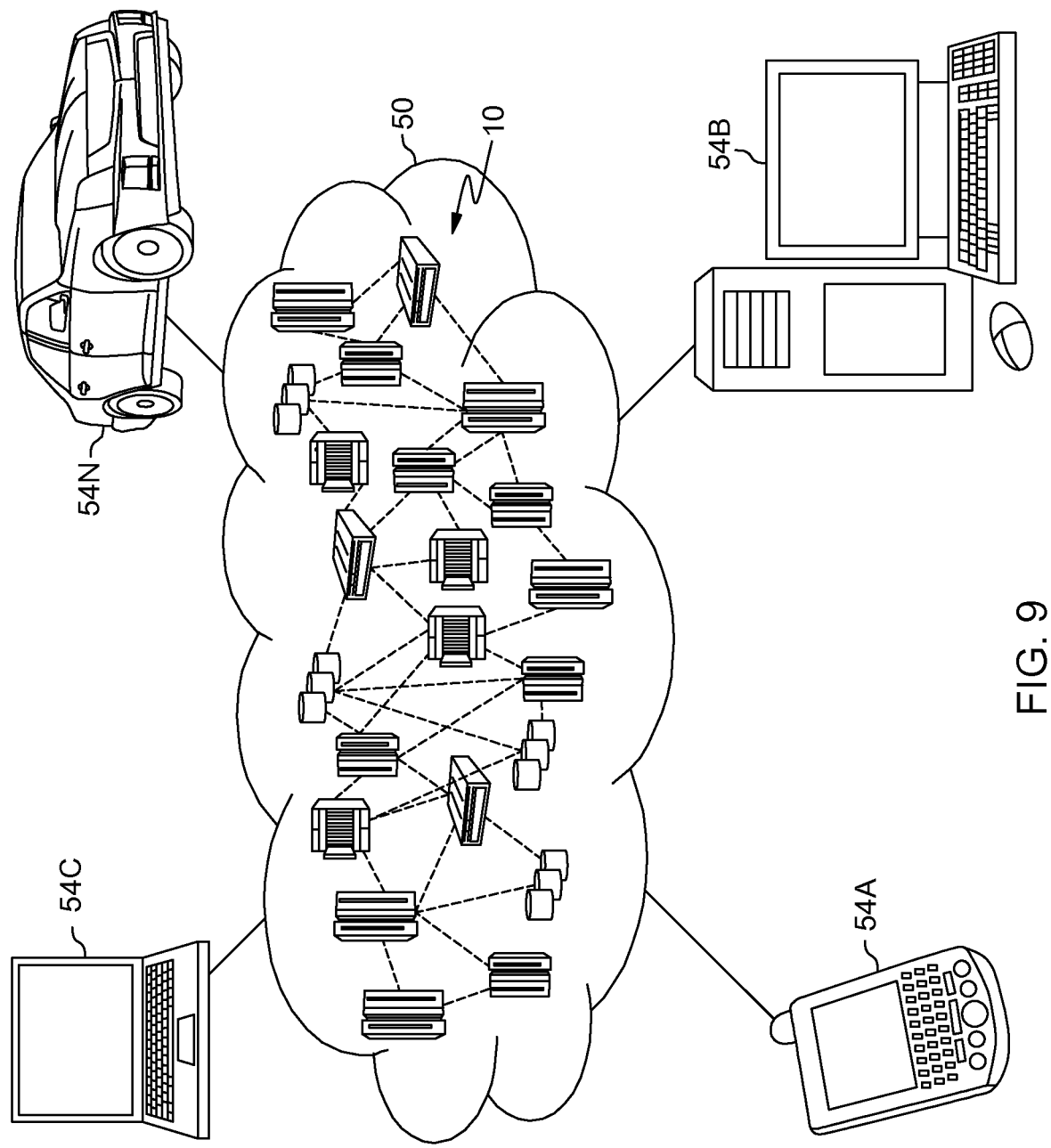
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
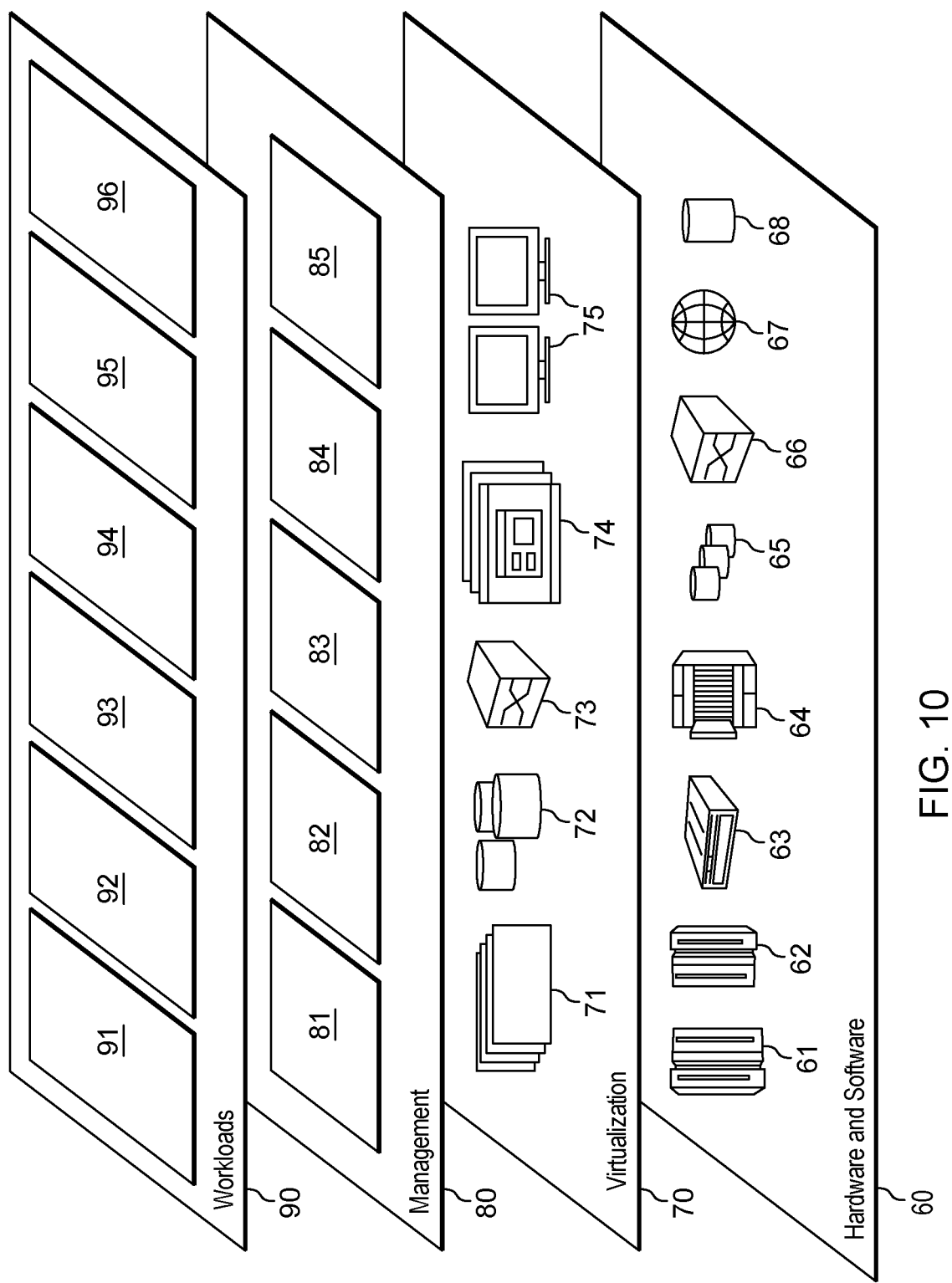
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining a response type for a search 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors, via a client computing device, an inquiry from a user, wherein the inquiry comprises a partial inquiry and wherein a complete inquiry comprises one or more predetermined condition elements and wherein the inquiry is missing one or more of the one or more predetermined condition elements;
soliciting, by the one or more processors, the missing one or more predetermined condition elements from the client device to complete the inquiry, wherein the soliciting comprises:
  determining, by the one or more processors, based on the inquiry, response types relevant to the inquiry, and condition elements for utilization, by the one or more processors, in determining a unique response type of the inquiry;
  generating, by the one or more processors, for each response type, a response form, wherein each response form comprises one or more slots comprising the condition elements;
  utilizing, by the one or more processors, the response forms to generate a sum of products expression, wherein each sum term of the sum terms added together to generate the sum of products expression represents a response type of the response types;
  transforming, by the one or more processors, the sum of products expression into a product of sums expression comprising the sum terms, wherein the sum terms in the product of sums expression comprise a whole product of the product of sums expression;
  utilizing, by the one or more processors, a first sum term from the sum terms to generate a prompt for a further question to the user, via the client computing device, wherein the further question solicits one or more of the missing one or more predetermined condition elements from the client device to complete the inquiry;
  obtaining, by the one or more processors, via the client computing device, data responsive to the further question;
  interpreting, by the one or more processors, the data into one or more condition primitives;
  identifying, by the one or more processors, one or more sum terms comprising the one or more interpreted condition primitives, based on comparing the one or more interpreted condition primitives to the condition elements of each sum term of the one or more sum terms comprising the one or more interpreted condition primitives;
  deleting, by the one or more processors, the identified one or more sum terms comprising the one or more interpreted condition primitives from the whole product of the product of sums expression;
  determining, by the one or more processors, if deleting the identified one or more sum terms comprising the one or more interpreted condition primitives rendered the product of sums expression empty;
  based on determining, by the one or more processors, that the product of sums expression is empty:
    identifying, by the one or more processors, the unique response type of the response types, wherein the inquiry is complete based on the product of sums expression being empty; and
    executing, by the one or more processors, the complete inquiry in a target system;
  based on determining that the product of sums expression is not empty, utilizing, by the one or more processors, a second sum term from the sum terms remaining after the deleting, to generate a prompt for another further question to the user, via the client computing device, wherein the sum terms remaining after the deleting comprise remaining terms, wherein the product of sums expression after the deleting is a modified product of sums expression, and wherein the other further question solicits one or more of the missing one or more predetermined condition elements from the client device to complete the inquiry.

2. The computer implemented method of claim 1, further comprising:
based on determining, by the one or more processors, that the product of sums expression is empty, providing, by the one or more processors, the unique response type to the user, via the client computing device.

3. The computer implemented method of claim 1, further comprising:
obtaining, by the one or more processors, via the client computing device, additional data responsive to the other further question;
interpreting, by the one or more processors, the additional data into one or more additional condition primitives;
identifying, by the one or more processors, one or more remaining terms comprising the one or more interpreted additional condition primitives of the additional data, based on comparing the one or more interpreted additional condition primitives of the additional data to the condition elements of the remaining terms;
deleting, by the one or more processors, the identified one or more remaining terms comprising the one or more interpreted additional condition primitives of the additional data from the whole product of the modified product of sums expression;
determining, by the one or more processors, if deleting the identified one or more remaining terms comprising the one or more interpreted additional condition primitives of the additional data rendered the modified product of sums expression empty; and
based on determining, by the one or more processors, that the modified product of sums expression is empty, identifying, by the one or more processors, the unique response type of the response types.

4. The computer-implemented method of claim 1, wherein determining response types and condition elements comprises utilizing a slot-filling system.

5. The computer-implemented method of claim 1, wherein transforming the sum of products comprises applying De Morgan's Law twice to the sum of products.

6. The computer-implemented method of claim 1, where the further question comprises a condition element.

7. The computer implemented method of claim 1, wherein the first sum term comprises a sum term and of sum terms with a smallest number of relevant condition elements.

8. The computer implemented method of claim 1, wherein the first sum term comprises a sum term and of sum terms with relevant condition elements comprising condition types of a lower dispersion than dispersions of a group of sum terms excluding the first sum term.

9. The computer-implemented method of claim 1, wherein the condition elements are selected from the group consisting of: an intent and an entity.

10. The computer-implemented method of claim 1, wherein utilizing the response forms to generate an expression comprising a sum of products, comprises generating a Boolean algebraic expression.

11. The computer implemented method of claim 1, wherein each condition element is represented by a condition primitive.

12. A computer program product comprising:
a computer readable storage medium readable by one or more processors and storing instructions for execution by the one or more processors for performing a method comprising:
obtaining, by the one or more processors, via a client computing device, an inquiry from a user, wherein the inquiry comprises a partial inquiry and wherein a complete inquiry comprises one or more predetermined condition elements and wherein the inquiry is missing one or more of the one or more predetermined condition elements;
soliciting, by the one or more processors, the missing one or more predetermined condition elements from the client device to complete the inquiry, wherein the soliciting comprises:
determining, by the one or more processors, based on the inquiry, response types relevant to the inquiry, and condition elements for utilization, by the one or more processors, in determining a unique response type of the inquiry;
generating, by the one or more processors, for each response type, a response form, wherein each response form comprises one or more slots comprising the condition elements;
utilizing, by the one or more processors, the response forms to generate a sum of products expression, wherein each sum term of the sum terms added together to generate the sum of products expression represents a response type of the response types;
transforming, by the one or more processors, the sum of products expression into a product of sums expression comprising the sum terms, wherein the sum terms in the product of sums expression comprise a whole product of the product of sums expression;
utilizing, by the one or more processors, a first sum term from the sum terms to generate a prompt for a further question to the user, via the client computing device, wherein the further question solicits one or more of the missing one or more predetermined condition elements from the client device to complete the inquiry;
obtaining, by the one or more processors, via the client computing device, data responsive to the further question;
interpreting, by the one or more processors, the data into one or more condition primitives;
identifying, by the one or more processors, one or more sum terms comprising the one or more interpreted condition primitives, based on comparing the one or more interpreted condition primitives to the condition elements of each sum term of the one or more sum terms comprising the one or more interpreted condition primitives;
deleting, by the one or more processors, the identified one or more sum terms comprising the one or more interpreted condition primitives from the whole product of the product of sums expression;
determining, by the one or more processors, if deleting the identified one or more sum terms comprising the one or more interpreted condition primitives rendered the product of sums expression empty;
based on determining, by the one or more processors, that the product of sums expression is empty:
identifying, by the one or more processors, the unique response type of the response types, wherein the inquiry is complete based on the product of sums expression being empty; and
executing, by the one or more processors, the complete inquiry in a target system;
based on determining that the product of sums expression is not empty, utilizing, by the one or more processors, a second sum term from the sum terms remaining after the deleting, to generate a prompt for another further question to the user, via the client computing device, wherein the sum terms remaining after the deleting comprise remaining terms, wherein the product of sums expression after the deleting is a modified product of sums expression, and wherein the other further question solicits one or more of the missing one or more predetermined condition elements from the client device to complete the inquiry.

13. The computer program product of claim 12, further comprising:
based on determining, by the one or more processors, that the product of sums expression is empty, providing, by the one or more processors, the unique response type to the user, via the client computing device.

14. The computer program product of claim 12, further comprising:
obtaining, by the one or more processors, via the client computing device, additional data responsive to the other further question;
interpreting, by the one or more processors, the additional data into one or more additional condition primitives;
identifying, by the one or more processors, one or more remaining terms comprising the one or more interpreted additional condition primitives of the additional data, based on comparing the one or more interpreted additional condition primitives of the additional data to the condition elements of the remaining terms;
deleting, by the one or more processors, the identified one or more remaining terms comprising the one or more interpreted additional condition primitives of the additional data from the whole product of the modified product of sums expression;
determining, by the one or more processors, if deleting the identified one or more remaining terms comprising the one or more interpreted additional condition primitives of the additional data rendered the modified product of sums expression empty; and
based on determining, by the one or more processors, that the modified product of sums expression is empty, identifying, by the one or more processors, the unique response type of the response types.

15. The computer program product of claim 12, wherein determining response types and condition elements comprises utilizing a slot-filling system.

16. The computer program product of claim 12, wherein transforming the sum of products comprises applying De Morgan's Law twice to the sum of products.

17. The computer program product of claim 12, where the further question comprises a condition element.

18. The computer program product of claim 12, wherein the first sum term comprises a sum term and of sum terms with a smallest number of relevant condition elements.

19. A system comprising:
a memory;
one or more processors in communication with the memory;
program instructions executable by the one or more processors via the memory to perform a method, the method comprising:
obtaining, by the one or more processors, via a client computing device, an inquiry from a user, wherein the inquiry comprises a partial inquiry and wherein a complete inquiry comprises one or more predetermined condition elements and wherein the inquiry is missing one or more of the one or more predetermined condition elements;
soliciting, by the one or more processors, the missing one or more predetermined condition elements from the client device to complete the inquiry, wherein the soliciting comprises:
determining, by the one or more processors, based on the inquiry, response types relevant to the inquiry, and condition elements for utilization, by the one or more processors, in determining a unique response type of the inquiry;
generating, by the one or more processors, for each response type, a response form, wherein each response form comprises one or more slots comprising the condition elements;
utilizing, by the one or more processors, the response forms to generate a sum of products expression, wherein each sum term of the sum terms added together to generate the sum of products expression represents a response type of the response types;
transforming, by the one or more processors, the sum of products expression into a product of sums expression comprising the sum terms, wherein the sum terms in the product of sums expression comprise a whole product of the product of sums expression;
utilizing, by the one or more processors, a first sum term from the sum terms to generate a prompt for a further question to the user, via the client computing device, wherein the further question solicits one or more of the missing one or more predetermined condition elements from the client device to complete the inquiry;
obtaining, by the one or more processors, via the client computing device, data responsive to the further question;
interpreting, by the one or more processors, the data into one or more condition primitives;
identifying, by the one or more processors, one or more sum terms comprising the one or more interpreted condition primitives, based on comparing the one or more interpreted condition primitives to the condition elements of each sum term of the one or more sum terms comprising the one or more interpreted condition primitives;
deleting, by the one or more processors, the identified one or more sum terms comprising the one or more interpreted condition primitives from the whole product of the product of sums expression;
determining, by the one or more processors, if deleting the identified one or more sum terms comprising the one or more interpreted condition primitives rendered the product of sums expression empty;
based on determining, by the one or more processors, that the product of sums expression is empty:
identifying, by the one or more processors, the unique response type of the response types, wherein the inquiry is complete based on the product of sums expression being empty; and
executing, by the one or more processors, the complete inquiry in a target system;
based on determining that the product of sums expression is not empty, utilizing, by the one or more processors, a second sum term from the sum terms remaining after the deleting, to generate a prompt for another further question to the user, via the client computing device, wherein the sum terms remaining after the deleting comprise remaining terms, wherein the product of sums expression after the deleting is a modified product of sums expression, and wherein the other further question solicits one or more of the missing one or more predetermined condition elements from the client device to complete the inquiry.

20. The system of claim 19, the method further comprising: obtaining, by the one or more processors, via the client computing device, additional data responsive to the other further question; interpreting, by the one or more processors, the additional data into one or more additional condition primitives; identifying, by the one or more processors, one or more remaining terms comprising the one or more interpreted additional condition primitives of the additional data, based on comparing the one or more interpreted additional condition primitives of the additional data to the condition elements of the remaining terms; deleting, by the one or more processors, the identified one or more remaining terms comprising the one or more interpreted additional condition primitives of the additional data from the whole product of the modified product of sums expression; determining, by the one or more processors, if deleting the identified one or more remaining terms comprising the one or more interpreted additional condition primitives of the additional data rendered the modified product of sums expression empty; and based on determining, by the one or more processors, that the modified product of sums expression is empty, identifying, by the one or more processors, the unique response type of the response types.

* * * * *